United States Patent [19]

Twyman

[11] 4,332,515

[45] Jun. 1, 1982

[54] CARGO SPRING BATTEN

[76] Inventor: Raymond B. Twyman, 669 Grey Cliffs Ave., La Puente, Calif. 91744

[21] Appl. No.: 172,858

[22] Filed: Jul. 28, 1980

[51] Int. Cl.³ .................... B60P 7/14; B61D 45/00; B63B 25/24
[52] U.S. Cl. ................................ 410/149; 410/145; 410/151
[58] Field of Search ............... 410/143, 144, 145, 149, 410/151

[56] References Cited

U.S. PATENT DOCUMENTS

| 2,608,428 | 8/1952 | Eck | 410/149 |
| 2,627,821 | 2/1953 | Sjogren | 410/145 |
| 2,983,231 | 5/1961 | Henrikson | 410/149 |
| 3,214,027 | 10/1965 | Sharp | 410/145 X |

Primary Examiner—Joseph F. Peters, Jr.
Assistant Examiner—Howard Beltran
Attorney, Agent, or Firm—Arthur F. Holz

[57] ABSTRACT

A self adjustable spring-loaded brace for use in securing large objects such as cargo within a ship's hold is described consisting of a section of metal tubing with a specialized fitting at one end and at the other end a unitary spring-loaded plunger-cartridge assembly.

6 Claims, 4 Drawing Figures

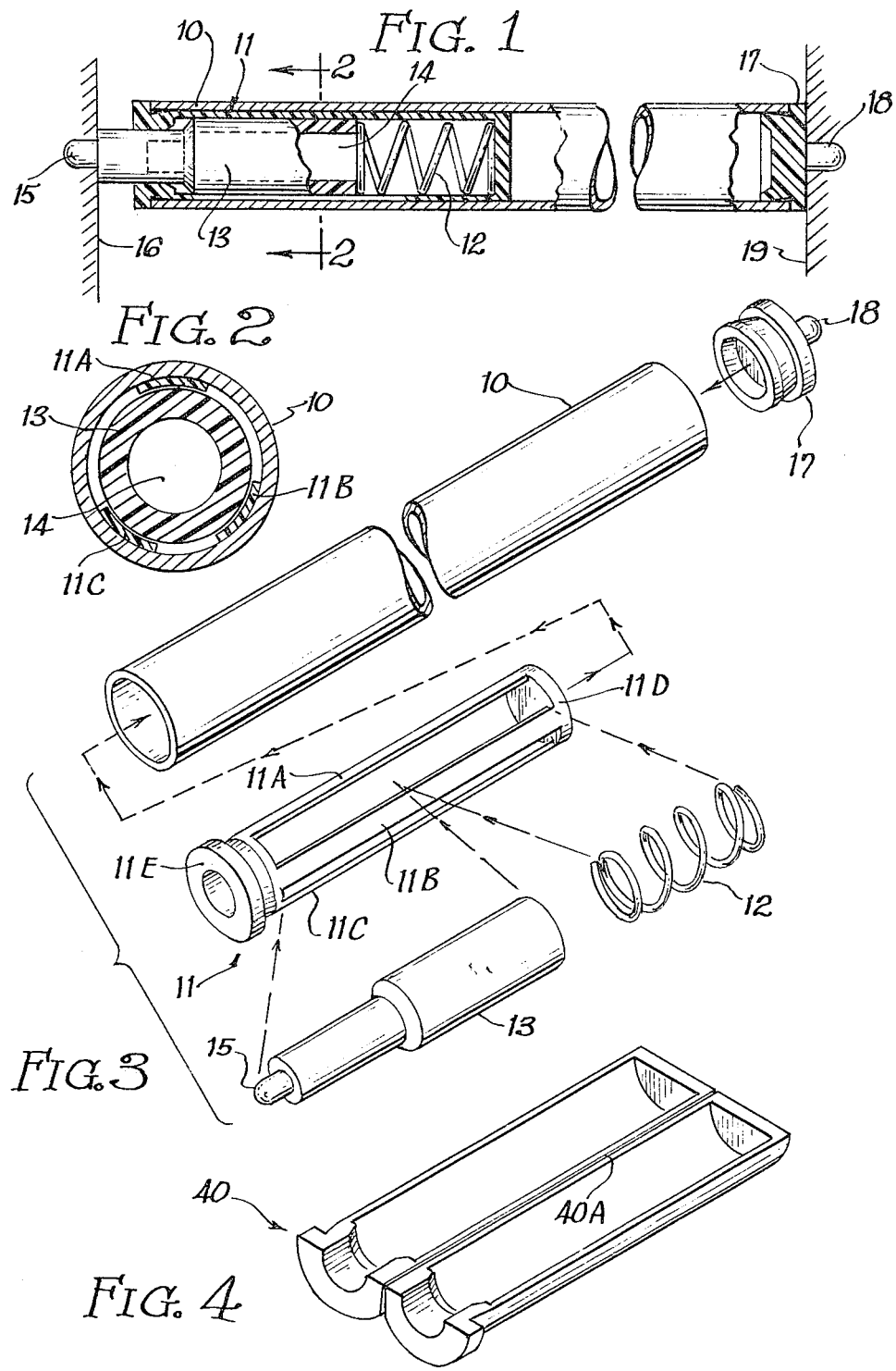

CARGO SPRING BATTEN

BACKGROUND OF THE INVENTION

Requirements for devices to secure and brace large objects such as crates that are being transported have long existed, and various systems and devices have resulted. Systems such as straps, hooks and tie downs are used in some aplications but are time and labor consuming when attaching and detaching such devices. Another common method of bracing is the use of rigid battens for bracing between cargo and the wall of a cargo chamber such as a ship's cargo hold. A number of rigid braces can be placed around the perameter of the cargo box and rigidly maintain separation between boxes and between the box and the bulk-head. These systems have the particular advantage of quick installation and removal but can maintain the position of cargo quite steadily when in use. Specialized fittings for attachment of the batten to the bulkhead on the one end and the cargo box on the other end are usually necessary. Also necessary is some method of adjusting the length of the batten or the distance between the fittings as the space between the cargo box and the wall may vary within some limits and an adjustment is necessary as well both to install and remove the batten. Further, some flexibility may be desirable to accommodate small ships in movement during carriage of the cargo.

Typical common battens of this sort in current usage consist of lengths of rigid metal pipe or tubing into which a specialized fitting is crimped or swaged at the one end by a machining process and a plunger is contained at the other end. Also restrained within the tube by a swaging operation at the end of the tube. The plunger in turn is flexibly extended from the tube by a spring within the tube and a bearing surface is provided for the spring to push against by a further crimping operation around the circumference of the tube.

Such currently available cargo battens have several disadvantages. One is that they cannot be disassembled and repaired if any of the internal parts break as the swaging necessary to contain the parts is permanent. Thus a batten with a broken plunger for instance would have to be discarded rather than repaired. Further, the batten itself is only useable at the exact length to which it is manufactured and cannot be cut down or adjusted for different applications. Since again the swaging at the ends is permanent and a cut off cannot be made. Finally as the parts of such a commonly used batten are metal the plunger bearing surface is a metal-to-metal contact and can easily bind, wear and chafe which adversly affects the function of the adjustable batten.

The within invention seeks to provide a new and improved batten of simplified construction. Thus an object of the invention described is to provide an improved batten that can be assembled without machining, crimping or suaging operations.

Another object of the invention is to provide an adjustable batten, the parts of which are removable and replacable.

Another object of the invention is to improve the functioning of a spring-loaded batten by reducing the internal friction and improving the quality of the plunger bearing surfaces.

The final object of the invention is to provide a batten that can be disassembled, cut down to adjust its length as required and reassembled.

SUMMARY OF THE INVENTION

The improved batten described herein is simply costructed of a straight metal tube which when cut to length needs no further machining. Inserted in the tube is a plug containing a specialized fitting at one end which is held into the tube by a friction fit and formed of molded plastic or the like. At the other, or adjustable end of the batten is a spring-loaded plunger protruding through a cap of molded plastic or the like which is held in place by a friction fit. Since no crimping in the center of the tube is required, the internal spring which supports the plunger action has no supporting surface on the tube itself to retain the spring or to provide a bearing surface to push against. Thus the retaining surface is provided as an extended part of the plug unit through which the plunger protrudes as will be seen later with reference to the drawings. The unit thus formed with the spring retaining end attached to the plunger plug cap forms a shell or cage containing the plunger and spring and the entire assembly is a self-contained unit or cartridge that is inserted into the tube. Thus the assembly operation of the improved batten consists merely of assembling the shell-plunger-spring unit inserting it into the metal tubing and inserting the fitting cap at the other end.

Since the plunger which is constructed of formed or molded plastic moves against the interior of the shell unit also constructed of plastic or rubber like material. The bearing surface of the plunger action moves smoothly and does not involve metal-to-metal contact or any contact with the interior of the tubing itself as with prior devices.

Since the assembly operation merely involves insertion of the plunger unit in one end and the plug fitting in the other end any internal broken parts can be replaced by removal of those units and replacement with a new part, providing significant economies. Also since the tubing does not require any machining it can be adjusted in its length merely by removing the plug end, cutting the tubing with a hacksaw and reinserting the plug.

BRIEF DESCRIPTION OF THE DRAWINGS

FIG. 1 is a lengthwise view of the improved batten incuding cutaway sections showing the internal parts;

FIG. 2 is a cross section along line 2—2 of FIG. 1;

FIG. 3 is an exploded perspective view illustrating assemby of the parts of the improved batten;

FIG. 4 is another perspective view of an alternate embodiment of the shell component which contains the spring and plunger;

DESCRIPTION OF THE PREFERRED EMBODIMENT

With reference to the drawings, FIG. 1 discloses a longtudinal view of the improved spring plunger batten the exterior casing of the batten consists of a length of metal tubing 10 shown in FIG. 1 both by exterior view and by cross-section cutaway view to be a standard dimension metal tube having a rigid wall. An interior housing 11 is shown in cross-section through the cutaway view extending from the perforated plug at the left end of the tube attached to the casing wall of the interior housing which extends to the cap end of the interior housing which also serves as the stop for spring 12. The spring provides extending force to the plunger 13 which slides within the housing and is shown in further cutaway to be of a hollow casting as it contains cavity 14, saving both weight and material in construction of the plunger. The plunger terminates at its left end extending through the hole provided in the cap end of the interior housing 11 and a nipple 15 is provided for insertion into a standard retaining fitting in the wall or bulkhead.

Thus the device is seen in FIG. 1 as it would be installed between a box wall 19 and a bulkhead 16 as a brace to steady the box of cargo. The pressure of the spring 12 against the interior retaining end on the one end and against the plunger on the other maintains the extensible positioning of the batten, and additionally provides a small range of flexibility between the plunger end of the batten and the plunger contact with the bulkhead wall. The insertion of the interior housing containing the plunger and spring can be seen to be independent of any machining or special operations on the casing 10 of the batten consisting of a plain metal tube. Further, the interior working parts contained within the tube are replaceable and easily reassembled.

FIG. 2 further illustrates the operation of the plunger along cross-section line 2—2 of FIG. 1. The exterior metal tube 10 contains the interior housing 11 shown in this view to have three rib-like sections 11a, 11b and 11c. Those ribs of the housing contain within them the hollow plunger 13 and provide separation between the plunger and casing wall and a bearing surface for the plunger to slide against.

FIG. 3 shows an exploded view of the components and assembly of the batten device. The exterior casing 10 simply receives the plug 17 at its one end. Said plug of a cast or molded plastic construction such that it will closely fit and be retained by friction in the end of the tube and defines an extended nipple 18. The interior housing 11 is shown separately from the casing but the direction of assembly is shown by the dashed arrow line from the end of the unit as it would be inserted into the tubular casing. The interior housing is shown in this view to be a unitary molded or cast plastic element having several aspects: 11a, 11b and 11c are the rib-like walls of the housing connecting the spring cap end 11d to the plug end 11e which again is molded to a shape that will provide a press friction fit in the end of the tube and is molded to contain an opening through which the plunger extends. The spring 12 and plunger 13 are contained within the housing before it is inserted into the tube merely by spreading the ribs and inserting those components.

Thus the assembly takes the form simply of inserting the plunger 13 and spring 12 into housing 11 and inserting the assembled spring-plunger-housing unit as a cartridge-type assembly into tube 10 and capping the other end with plug 17.

FIG. 4 illustrates an alternative embodiment of the interior housing 11. The housing could also be constructed as a clamshell type cast or molded plastic unit 40 joined by a continuous molded plastic hinge 40a. The alternative method of assembly of the batten unit using this component would involve merely laying the spring and plunger in one half of the interior housing and closing the housing along its hinge to form a continuous tube with the plunger end extending through the hole in the cap end. The unit would be inserted as a cartridge in the metal tube casing 10 in the same manner as the first embodiment of the interior housing assembly detailed in FIG. 3.

Thus the within disclosure describes an improved cargo batten easily assembled without extensive metal working or machining, while providing superior operation of the spring plunger retaining elements and easy repair and replaceability of components.

Having thus described my invention I claim:

1. A cartridge-loaded cargo batten comprising:
   (a) an elongated casing having a first and a second end;
   (b) said first end defining an axially extended first nipple;
   (c) said second end being open and said casing having a hollow portion entrant therefrom;
   (d) a hollow cartridge inserted into said hollow portion, said cartridge comprising:
      (i) an opening defined in said hollow cartridge one end thereof adjacent said second end of said casing and said cartridge having a second closed end;
      (ii) an axially movable elongated plunger having a spring engaged end captured in said cartridge and mounting an elongated second nipple extending through said cartridge opening;
      (iii) means between the spring engaged plunger end and said second closed end biasing said plunger axially relative to said cartridge out through said opening;
      (iiii) means for releasibly engaging said casing and limiting the depth of insertion of the cartridge therein;
   (e) whereby said cartridge is removable from said casing for repair or replacement.

2. Structure according to claim 1 wherein said bias means is removably captured in said cartridge.

3. Structure according to claim 2 wherein said cartridge comprises a generally cylindrical cage with angularly spaced longitudinally extended resilient ribs defining the cylindrical surface whereof said plunger and bias means are removably insertable into said cartridge between said ribs by expanding same.

4. Structure according to claim 2 wherein said cartridge is axially split into two semi cylinders hinged together along one logitudinal edge to clamshell around said plunger and bias means.

5. Structure according to claim 1 wherein said means releasibly engaging said casing and limiting the depth of insertion comprises a flanged friction fitting collar integral with said cartridge and defining said opening whereof said cartridge can be press fitted plug-like into said hollow portion and limited by said flange.

6. Structure according to claim 1 wherein said first nipple is mounted on a removable plug press fitted into the first end of said casing.

* * * * *